H. T. CASE.
COMBINATION FLUID AND VACUUM CHECK.
APPLICATION FILED MAR. 29, 1909.
942,887.
Patented Dec. 14, 1909.
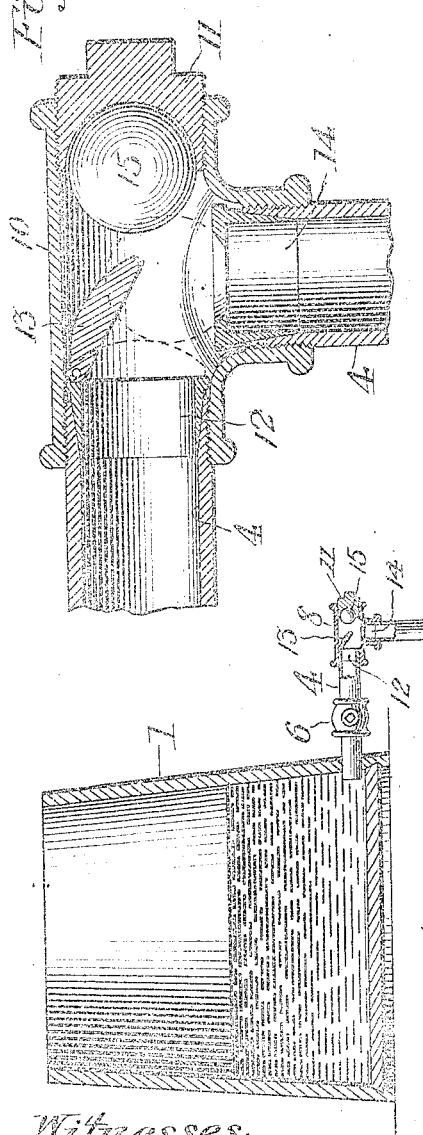
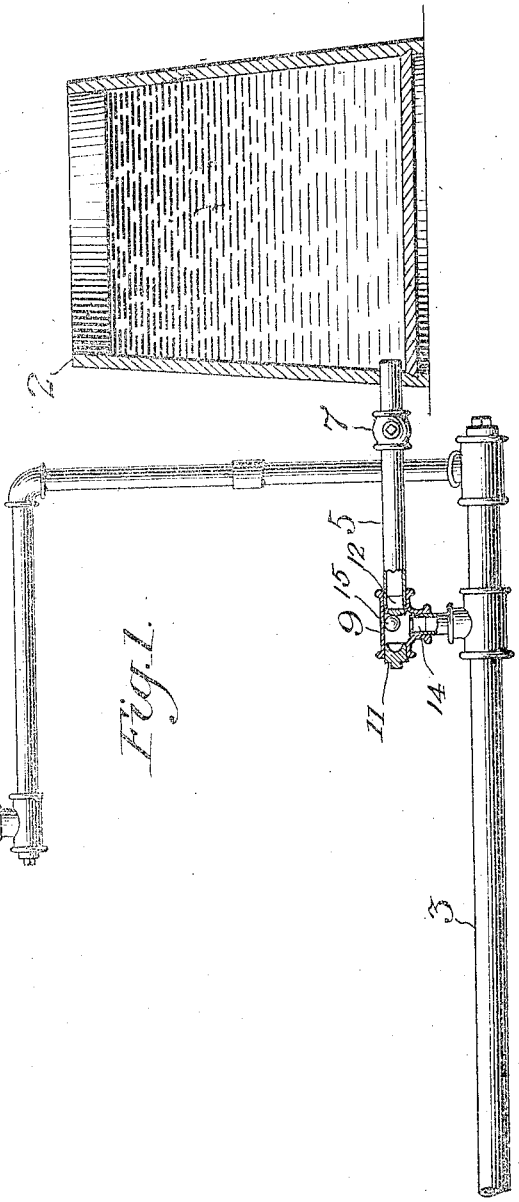
Witnesses:
Lillie M. Perry.
E. A. Finckel.
Inventor.
Harry T. Case
by Wm. F. Finckel
Atty

UNITED STATES PATENT OFFICE.

HARRY T. CASE, OF FRANKLIN, PENNSYLVANIA.

COMBINATION FLUID AND VACUUM CHECK.

942,887.   Specification of Letters Patent.   Patented Dec. 14, 1909.

Application filed March 29, 1909. Serial No. 486,503.

*To all whom it may concern:*

Be it known that I, HARRY T. CASE, a citizen of the United States, residing at Franklin, in the county of Venango and State of Pennsylvania, have invented a certain new and useful Improvement in Combination Fluid and Vacuum Checks, of which the following is a full, clear, and exact description.

The object of this invention is to provide means for controlling the flow of fluids in such situations as pipe lines for transporting oil from oil tanks, and where the fluid is carried through pipes, and it is desirable to maintain a vacuum in the pipes.

The invention consists in what, for want of a better name, may be called a combination check valve, arranged in the outflow pipe of a tank or other vessel, in connection with any suitable stop-cock or other valve, so that where several of these tanks or other receptacles or reservoirs are connected on the same main line, and are arranged at different altitudes, the overflow on the lower tanks will be prevented automatically. The check valve comprises an ordinary flap or check operating on one pipe and a ball valve on another pipe, a flap or check valve and a ball valve contained in a single casing being arranged in conjunction with each tank or other receptacle.

In the accompanying drawings, illustrating the invention, in the several figures of which like parts are similarly designated, Figure 1 is a somewhat conventional elevation and partial section showing one tank at one elevation and another tank at a lower elevation, with interposed outlet pipes containing a plug or other stop cock for each tank, and the combination check valves, and both tanks connected with a main line. Fig. 2 is a longitudinal section, on a larger scale, of a combination check valve suitable for the purposes of this invention, the valves being shown open in full lines and closed in dotted lines.

1 may represent an oil tank, or other receptacle or reservoir for the fluid to be moved, and 2 another such tank or reservoir arranged at a lower level.

3 is the main or transportation pipe, and 4 and 5 are outlet pipes connecting these tanks with the main. In each outlet pipe is a plug or other valve or stop cock, 6 and 7, and interposed in these outlet pipes are the combination check valves 8 and 9.

Inasmuch as the combination check valves are alike, and both are represented in Fig. 2, a description of one will suffice for all.

Each combination check valve comprises a casing 10, which may be a casting, in the form of a tee, having its three nipples internally screwthreaded. One nipple receives the horizontal portion of the outlet pipe and another of these nipples receives the vertical portion of the outlet pipe, and these two portions of the pipe are reamed out internally on a bevel. The other nipple receives the closing plug 11 which is hollowed out on the inside. In the horizontal pipe, 4 or 5, is arranged a tapered valve seat 12, which carries the flap valve 13 hinged thereto at its upper end and seating on the mouth of the valve seat. The other pipe receives a tapered valve seat 14 which receives the ball valve 15.

By providing tapered valve seats, the construction is simplified, as is also the assembling of the parts, and their repair.

When the valve, for instance the valve 6, is opened, the weight and pressure of the fluid in the tank will automatically open the flap valve 13, and the relation of the flap valve to the ball valve is such that when the flap valve starts to open, it will force the ball valve off of its seat, and the fluid will then flow toward the main; and this position of parts will be maintained until the tank is empty, or the valve 6 closed. When this occurs the flap valve falls back in place against its seat and allows the ball valve to roll back on its seat, thereby retaining the vacuum in the pipe line and preventing said pipe line from being sucked full of air.

The flap valve in addition to pushing the ball valve off of its seat in its action also serves as a check valve against fluid backing up into the tank and overflowing it in case of the higher tank being turned on on a line with the lower tank. In this case the fluid from the higher tank backing up in the pipes of the lower tank raises the ball valve on the lower tank off of its seat, but presses against the flap valve on the lower tank, and prevents the fluid from backing up into and overflowing such lower tank, as clearly indicated in Fig. 1.

The proportions between the flap valve and the ball valve and their relative arrangement may be and preferably are such that when the flap valve is opened by the passing fluid and has pushed the ball valve from its seat, said flap valve will prevent the ball valve from returning to its seat while the fluid is flowing.

It will be seen that should a tank on a low level be opened to discharge its fluid and one on a higher level be simultaneously opened, the action of the fluid from the higher tank will close the check valve in the lower tank and prevent it from overflowing.

The invention is not limited to the provision of the independent seats for the flap valve and the ball valve, or the construction described, which is preferred. It is essential, however, that the flap valve and the ball valve should be arranged substantially at right angles in order to operate to the best advantage.

What I claim is:—

1. A combination fluid and vacuum check, comprising a tee having a seat and a flap valve thereon, and another seat and a ball valve therefor, the seats for the flap valve and the ball valve being arranged substantially at right angles, and the flap valve when under pressure serving to force the ball valve off of its seat.

2. In a combined fluid and vacuum check, a tee, a plug for closing one end, a pipe inserted in the other end and provided with a reamed-out end, a wedge-shaped valve seat wedged in said reamed-out end of the pipe, a flap valve thereon, and a pipe inserted in the intermediate portion of the tee, a wedge-shaped valve seat wedged in said pipe and a ball valve for said last mentioned seat, the flap valve and the ball valve seats arranged at substantially right angles in said tee.

3. In combination with tanks arranged at different altitudes, a main pipe line, connections between said tanks and said pipe line, and a combined fluid and vacuum check valve interposed in each tank connection and comprising a ball valve and a flap valve having seats arranged at substantially right angles, the combination being such that when the check valve of the higher tank is opened for the outflow of the fluid from the tank, the ball valve of the check valve in the lower tank will be automatically unseated and the flap valve closed against the escape of the fluid from said lower tank.

4. The combination with a tank and a pipe line, of a casing, a flap valve serving as a fluid check, and a ball valve operating as a vacuum check, said valves being arranged to seat at right angles to one another in said casing and working in conjunction with each other, the combination being such that so long as there is fluid passing the valves from the tank, the open fluid check holds the vacuum check off of its seat, allowing the fluid to pass through, and as soon as the last of the fluid leaves the tank and enters the pipe line, the vacuum thus created on said pipe line pulls the ball valve, or vacuum check, onto its seat, thereby preventing air from entering said line and thus maintaining the vacuum.

In testimony whereof I have hereunto set my hand this 27th day of March A. D. 1909.

HARRY T. CASE.

Witnesses:
JAMES H. LE GOULLON,
L. S. MARSHALL.